US012811946B2

(12) United States Patent
Payment et al.

(10) Patent No.: US 12,811,946 B2
(45) **Date of Patent: *Nov. 24, 2026**

(54) MANAGING ACCESS TO RESOURCES USING SERIALIZED TOKENS

(71) Applicant: Twilio Inc., San Francisco, CA (US)

(72) Inventors: Alexandre Payment, San Francisco, CA (US); Liran Nuna, Austin, TX (US); Vivek K. Laddha, San Ramon, CA (US)

(73) Assignee: Twilio Inc., San Francisco, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 18/947,547

(22) Filed: Nov. 14, 2024

(65) Prior Publication Data

US 2025/0080540 A1 Mar. 6, 2025

Related U.S. Application Data

(63) Continuation of application No. 17/661,009, filed on Apr. 27, 2022, now Pat. No. 12,166,765.

(51) Int. Cl.
*H04L 9/40* (2022.01)

(52) U.S. Cl.
CPC .......... *H04L 63/102* (2013.01); *H04L 63/062* (2013.01); *H04L 63/20* (2013.01)

(58) Field of Classification Search
CPC ..... H04L 63/102; H04L 63/062; H04L 63/20; H04L 63/0807
See application file for complete search history.

(56) References Cited

U.S. PATENT DOCUMENTS 10,713,435 B1 * 7/2020 Sreedharan ........... G06F 40/279
2019/0243831 A1 * 8/2019 Rumiantsau ............ G10L 15/26
2020/0192978 A1 * 6/2020 Sivagnanam ......... G06F 40/284
2021/0365632 A1 * 11/2021 Trim ......................... G06N 3/09
2022/0198283 A1 * 6/2022 Patodia ............... G06F 16/2246
2023/0161952 A1 * 5/2023 Garimella ................ G06N 3/08 715/224

* cited by examiner

*Primary Examiner* — Mohammad W Reza
(74) *Attorney, Agent, or Firm* — Schwegman Lundberg & Woessner, P.A.

(57) ABSTRACT

A role-based access control method and system provide for receiving a request to provide an access to a resource, identifying a plurality of permissions associated with the request, authorizing the request including determining the plurality of permissions are granted for the identity, generating a serialized token to represent the plurality of permissions, and passing the serialized token to the first service to perform the providing of the access to the resource.

20 Claims, 10 Drawing Sheets

MANAGING ACCESS TO RESOURCES USING SERIALIZED TOKENS

CLAIM OF PRIORITY

This Application is a Continuation of U.S. application Ser. No. 17/661,009, filed Apr. 27, 2022, which is hereby incorporated by reference in its entirety.

TECHNICAL FIELD

The subject matter disclosed herein generally relates to methods, systems, and machine-readable storage media for techniques of managing access to computing resources using serialized tokens.

BACKGROUND

Current communication systems provide users with permissions to access resources based on limited types of roles, resulting in unintended access to resources that are restricted for certain users. Additionally, conventional solutions for providing controlled access can consume substantial computing resources, including data processing power, memory, bandwidth, and so on, especially when the implementation is at a large scale across multiple systems or services.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
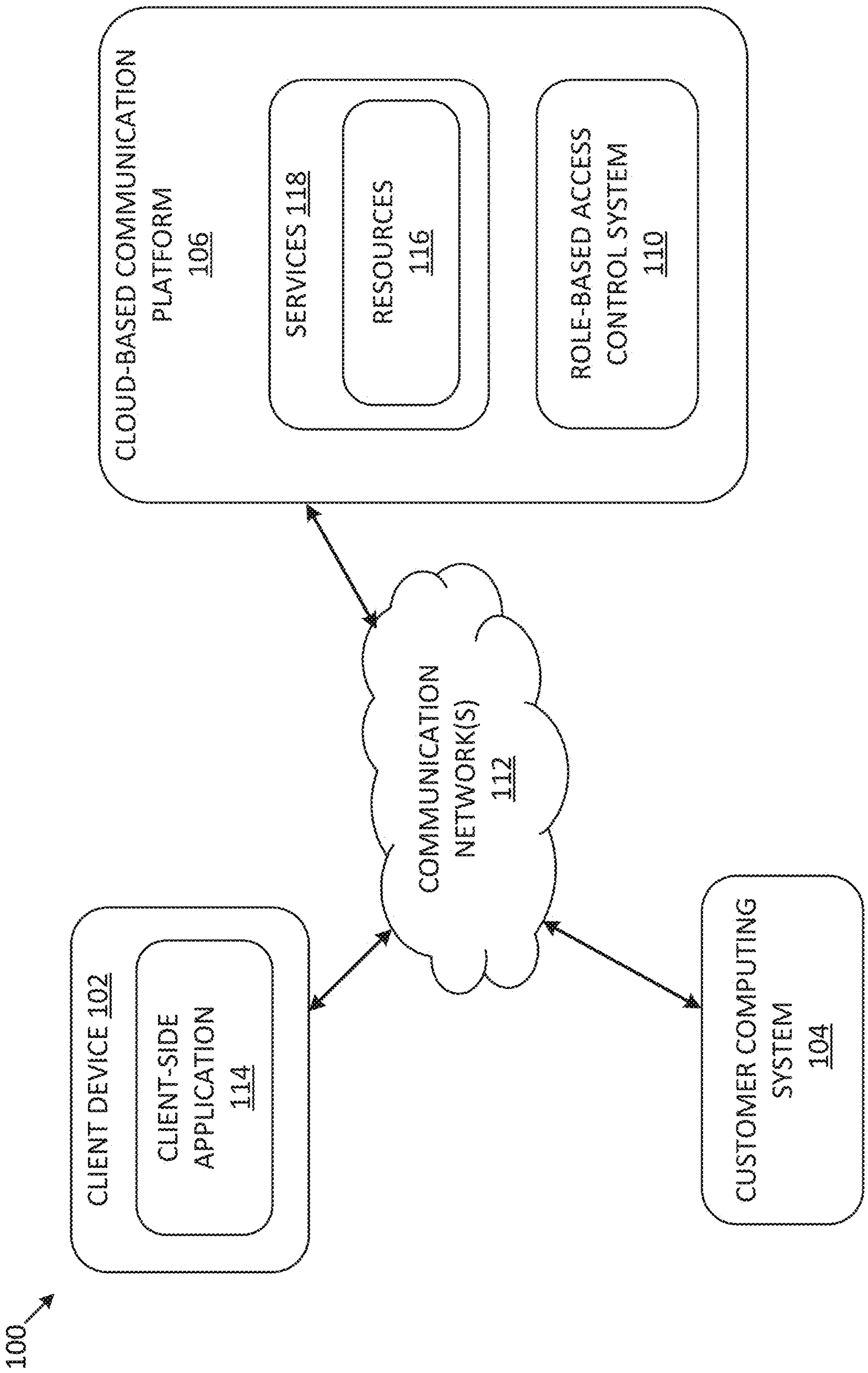
FIG. 1 depicts a block diagram showing an example networked environment in which the disclosed technology may be practiced, according to various example embodiments.

The description that follows includes systems, methods, techniques, instruction sequences, and computing machine program products that embody illustrative embodiments of the present disclosure. In the following description, for purposes of explanation, numerous specific details are set forth in order to provide a thorough understanding of example embodiments. It will be evident, however, to one skilled in the art that the present inventive subject matter may be practiced without these specific details.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Various embodiments include systems, methods, and non-transitory computer-readable media for generating and managing access to resources using role-based access control. In various embodiments, a role-based access control (RBAC) system receives a request to provide access to a resource in a communication platform (e.g., via a console interface or an API interface). The RBAC system determines one or more permissions based on the request. A request may include one or more of: a Uniform Resource Identifier (URI), one or more hypertext transfer protocol (HTTP) verbs, and one or more headers. Specifically, the RBAC system may classify the URI into a permission. A permission is an authorization granted to an identity, such as a user, an application, or a credential, such as an API Key, to perform an action on a resource specified in the permission. A permission may be represented by a text string that includes four parts: namespace, product name, resource name, and the type of action. Each of these parts is an identifier separated by a "/," such as /namespace/product name/resource name/action. For example, a permission to make a phone call can be represented by a text string "/entity/product/call/create." In various embodiments, a wildcard (i.e., *) may be used to indicate all access to the associated part is granted. In some embodiments, a wildcard may be used to authorize multiple permissions at once. A text string may correspond to an assertion that maps to one or more URIs.

A resource may be associated with an identifier (e.g., a public URI) and method (e.g., GET, PUT, POST, DELETE). The communication platform may register multiple URIs for a single permission and may register multiple permissions for a single role. Once a permission is granted, the user may perform the action on the particular resource associated with the product and namespace specified in the permission. Actions configured to be performed on resources may include, for example, read, create, update, delete, and list.

Upon authorizing a request to provide access to certain resources, the RBAC system generates a serialized token to pass down the identified (or classified) one or more permissions to provide access to the requested resources. Specifically, upon authorizing the request, the processor generates a graph (e.g., a m-ary tree, as the first graph illustrated in FIG. 8) representing a serialized token that includes the verified permissions (e.g., the plurality of permissions). A m-ary tree is a data structure that includes a collection of nodes. The m-ary tree may be converted into a text string that consumes very little storage space in comparison to a string that is not converted from an m-ary tree. Under this approach, a serialized token may be packed in a header (e.g., HTTP header) of a file (or a request) to be passed to downstream services for optional processing (e.g., by one or more additional systems or services that are specially configured to consume the serialized token). The size of a header may depend on the type of web server. For example, the size of a header may be between 8 kb and 16 kb. In various embodiments, a size of a header may be an upper bound size for a header.

In various embodiments, accessing one resource requires permissions to access additional resources due to resource dependencies. Therefore, a number of permissions may be needed to be passed down to one or more services to provide access to the resource as requested. In various embodiments, a service includes one or more resources. In various embodiments, a service itself may be a resource.

In various embodiments, the RBAC system signs (or causes the signing of) the serialized token before passing the token to the downstream services (e.g., first service) to provide access to the resource. In various embodiments, a serialized token is signed using a digital signature algorithm (e.g., Edwards-curve Digital Signature Algorithm) before being sent out by the RBAC system to downstream services (e.g., services 118). In various embodiments, the RBAC system may generate and share a public key to allow other entities (e.g., external entities) to verify the serialized token.

In various embodiments, a role may be created for or assigned to an identity to include one or more permissions. In various embodiments, a user may be a person, or a group of people. A permission can be assigned to an application (e.g., an application associated with an application user), or to a credential (e.g., an API Key). An application may be developed by a third party (e.g., a customer) using client-side SDK kits provided by the communication platform.

In various embodiments, if the RBAC system is unable to classify the resource identifier (e.g., the URI) into an existing permission, the RBAC system may unauthorize the request, discard the request, or redirect the request to an additional system communicatively coupled to the communication platform and specially configured to handle the failure of the RBAC system to classify the resource identifier.

Figure 6:
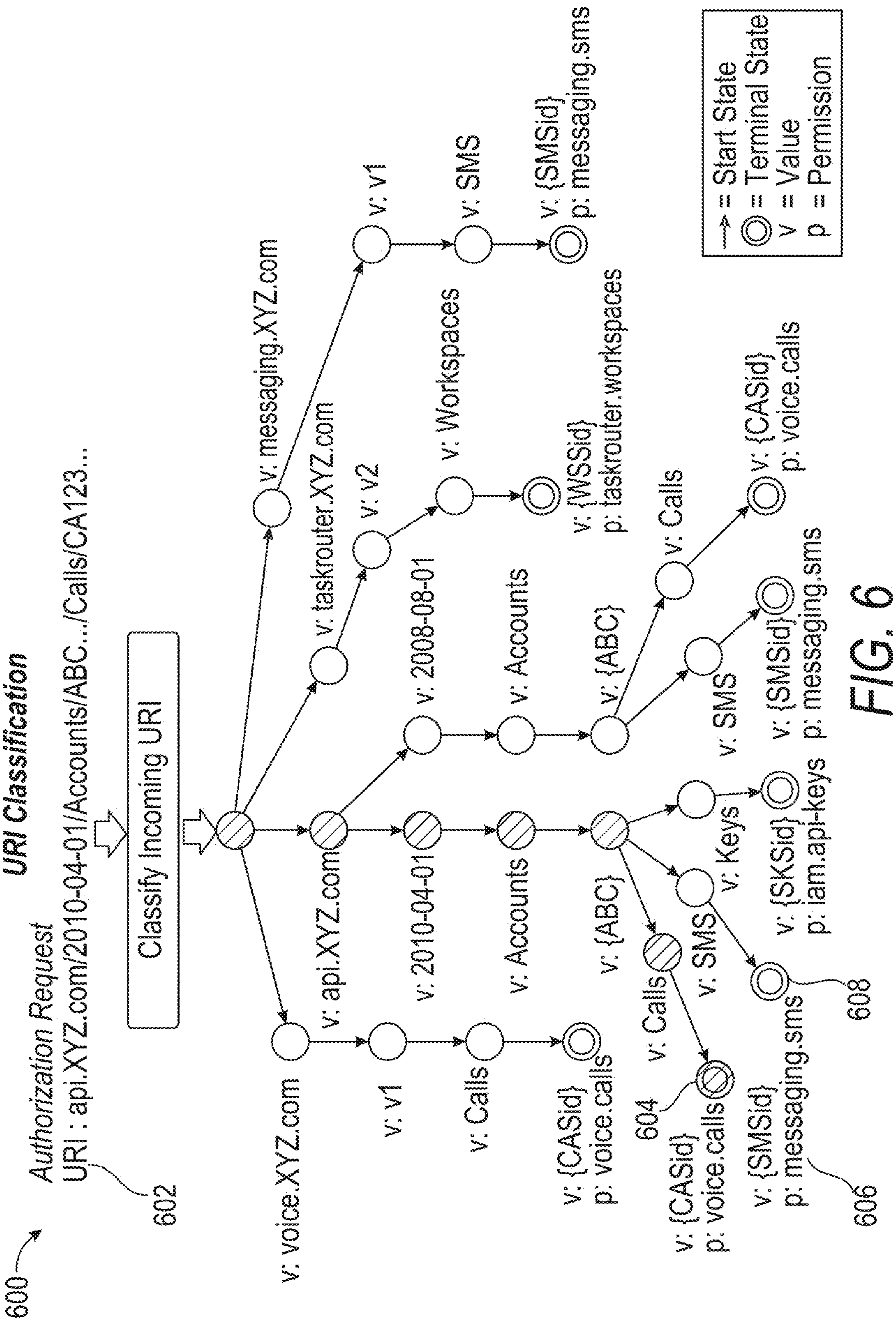
FIG. 6 depicts a block diagram showing an exemplary tree structure illustrating an example URI classifier, according to various example embodiments.

In various embodiments, the RBAC system generates a graph, such as a tree structure, of all the permission the identity has been granted, and traverses the graph to match the classified permission with a permission included in the graph, such as the graph illustrated in FIG. 6. If the RBAC system determines there is a match, the request may be authorized. Otherwise, the request may be denied. In various embodiments, the graph may be generated at run time. For example, once a graph (also referred to as assertion tree) is generated at run time, the graph may be stored in volatile computer memory (e.g., cache memory) for a limited time period, as an identity is likely to request access to resources again shortly after making the first request. In various embodiments, a session may be initiated once a request is authorized for an identity (e.g., a user, an application, or a credential). The graph may be temporarily stored in cache memory for the duration of the session. In various embodiments, RBAC system may dynamically update the graph to incorporate detected changes at run time.

In various embodiments, the RBAC system causes a display of a user interface, including an indication of authorization status indicating whether the request is authorized. For example, the indication of authorization status may be a selectable user interface element (e.g., a window or an icon) notifying the identity the request is allowed or denied. In some examples, if the request is authorized, the RBAC system may cause the requested resource to be accessible by the requesting identity (e.g., displaying the resource in the user interface) or cause the action specified in the permission to be automatically executed (e.g., deleting the resource specified in the request).

In various embodiments, the RBAC system may receive a request to assign a role (e.g., customized role) to an identity. The role is associated with a list of permissions. The RBAC system may match the list of permission specified in the request to existing permissions available on the communication platform and generate the role for the identity by associating the list of permissions with the identity. In various embodiments, the RBAC system provides existing permissions available on the communication platform to a customer so that the customer can create a role that can be assigned to an identity. The assignment may cause the list of permissions included in a role to be associated with the identity for access within a scope of resources.

In various embodiments, a communication platform may include a number of products (or services) in the namespace. A resource may be a product, or a feature associated with a product, such as a phone number, a call record, a studio flow, or a message. The RBAC system may reside in the communication platform, as illustrated in FIG. 1, or may be an external system that is communicatively coupled to the communication platform. In various embodiments, a service includes one or more resources. In various embodiments, a service itself may be a resource.

In various embodiments, a request may be an API request that can be authenticated using an API key. An API request occurs when an identity (e.g., a user or an application) makes a call to a server using an endpoint. An API endpoint refers to a touchpoint of an interaction between an API and a system. An API endpoint provides the location where an API accesses a resource.

In various embodiments, a permission can register multiple URIs to accommodate multiple interfaces and system versions that can be used to access the resource, e.g., public API endpoints, console, SDK, etc.

According to various embodiments described herein, the RBAC system solves the technological problems, including all services having to implement their own access control systems. Under the approach described in various embodiments, the RBAC system provides a common API and token that allow all downstream systems to optionally use so that services don't have to implement their own APIs.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 depicts a block diagram showing an example networked environment 100 in which the disclosed technology may be practiced, according to various example embodiments. As shown in FIG. 1, the example networked environment 100 includes multiple computing devices (e.g., client device 102), customer computing system 104, and cloud-based communication platform 106 communicatively coupled to a communication network 112 and configured to communicate with each other through the use of the communication network 112. The cloud-based communication platform 106 includes resources 116 and a role-based access control system 110 (also referred to as RBAC system 110). In various embodiments, services 118 hosts or include one or more resources 116. A service may use the RBAC system 110 to manage access control. The RBAC system is meant to be a universal system that can be used by multiple services of the communication platform 106 such that each of the services does not need to implement its own access controls. In various embodiments, a communication platform 106 may include a number of products (or services 118) in the namespace. A resource may be a product or service, or a feature associated with the product or service. The RBAC system may reside in the communication platform, as illustrated in FIG. 1, or may be an external system that is communicatively coupled to the communication platform 106. In various embodiments, a service includes one or more resources. In various embodiments, a service itself may be a resource.

The communication network 112 is any type of network, including a local area network (LAN), such as an intranet, a wide area network (WAN), such as the internet, a telephone and mobile device network, such as cellular network, or any combination thereof. Further, the communication network 112 may be a public network, a private network, or a combination thereof. The communication network 112 is implemented using any number of communication links associated with one or more service providers, including one or more wired communication links, one or more wireless communication links, or any combination thereof. Additionally, the communication network 112 is configured to support the transmission of data formatted using any number of protocols.

Multiple computing devices can be connected to the communication network 112. A computing device is any type of general computing device capable of network communication with other computing devices. For example, a computing device can be a personal computing device such as a desktop or workstation, a business server, or a portable computing device, such as a laptop, smart phone, or a tablet personal computer. A computing device can include some or all of the features, components, and peripherals of the machine 1000 shown in FIG. 10.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The customer computing system 104 is one or more computing devices associated with a customer of the cloud-based communication platform 106 (also referred to as communication platform 106). A customer may be a business, a company, and/or any other type of entity that uses the services provided by communication platform 106. The customer may provide any type of service, such as a banking service, travel service, retail service, and the like. The service may be an online and/or offline service. That is, the service may be available only online, such as an online retailer, offline, such as a physical retailer, or both online and offline, such as a retailer that provides a website or application as well as a physical retail store.

The customer computing system 104 may facilitate any service of a customer that is provided online. In various embodiments, users of client devices 102 may interact with the customer computing system 104 via communication network 112 to utilize the online service provided by the customer. The customer computing system 104, however, does not have to provide an online service that is accessible to users. That is, the customer computing system 104 may simply be a computing system used by a customer to perform any type of functionality. In various embodiments, a user of a client device 102 may be a person or a group of people. A user may send requests to access certain resources on communication platform 106. A customer of the customer computing system 104 may be a business, company, and/or any other type of entity that develops applications using client-side SDK kits provided by the communication platform 106. The application (also referred to as application user) may send requests to access certain resources on the communication platform 106.

Although the networked environment 100 in FIG. 1 illustrates only one client device 102, and one customer computing system 104, this is only for ease of explanation and is not meant to be limiting. One skilled in the art would appreciate that the networked environment 100 can include any number of client devices 102, and/or customer computing systems 104. Further, each customer computing system 104 may concurrently interact with any number of client devices 102, and support connections from a variety of different types of client devices 102, such as desktop computers, mobile computers, mobile communications devices, e.g., mobile phones, smart phones, tablets; smart televisions, set-top boxes, and/or any other network-enabled computing devices. Hence, the client devices 102 may be of varying types, capabilities, operating systems, and so forth.

A user interacts with a customer computing system 104 via a client-side application 114 installed on the client devices 102. In some embodiments, the client-side application 114 includes a component specific to the customer computing system 104. For example, the component may be a stand-alone application, one or more application plug-ins, and/or a browser extension. However, the users may also interact with the customer computing system 104 via a third-party application, such as a web browser or messaging application, that resides on the client devices 102 and is configured to communicate with the customer computing system 104. In either case, the client-side application presents a user interface (UI) for the user to interact with the customer computing system 104. For example, the user interacts with the customer computing system 104 via a client-side application integrated with the file system or via a webpage displayed using a web browser application.

A user may also interact with communication platform 106 via the client-side application 114 installed on the client devices 102. In some embodiments, the client-side application includes a component specific to the communication platform 106. For example, the component may be a stand-alone application, one or more application plug-ins, and/or a browser extension. In various embodiments, the user may also interact with the communication platform 106 via console interface provided by the communication platform 106, such as a web browser or messaging application configured to communicate with the communication platform 106. In either case, the client-side application presents a user interface (UI) for the user to interact with the communication platform 106. A user or a customer may interact with communication platform 106 via an API interface or a console interface provided by the communication platform 106.

A customer may use a customer computing system 104 to cause transmission of communication messages (e.g., SMS messages) to intended recipients. For example, a customer computing system 104 may provide online functionality that enables users of the customer computing system 104 to transmit messages to agents of the customer and/or other users. As another example, the customer computing system 104 may transmit messages to users to provide the users with two-factor authentication, password resets, updates, links to content, promotions, etc.

Figure 2:
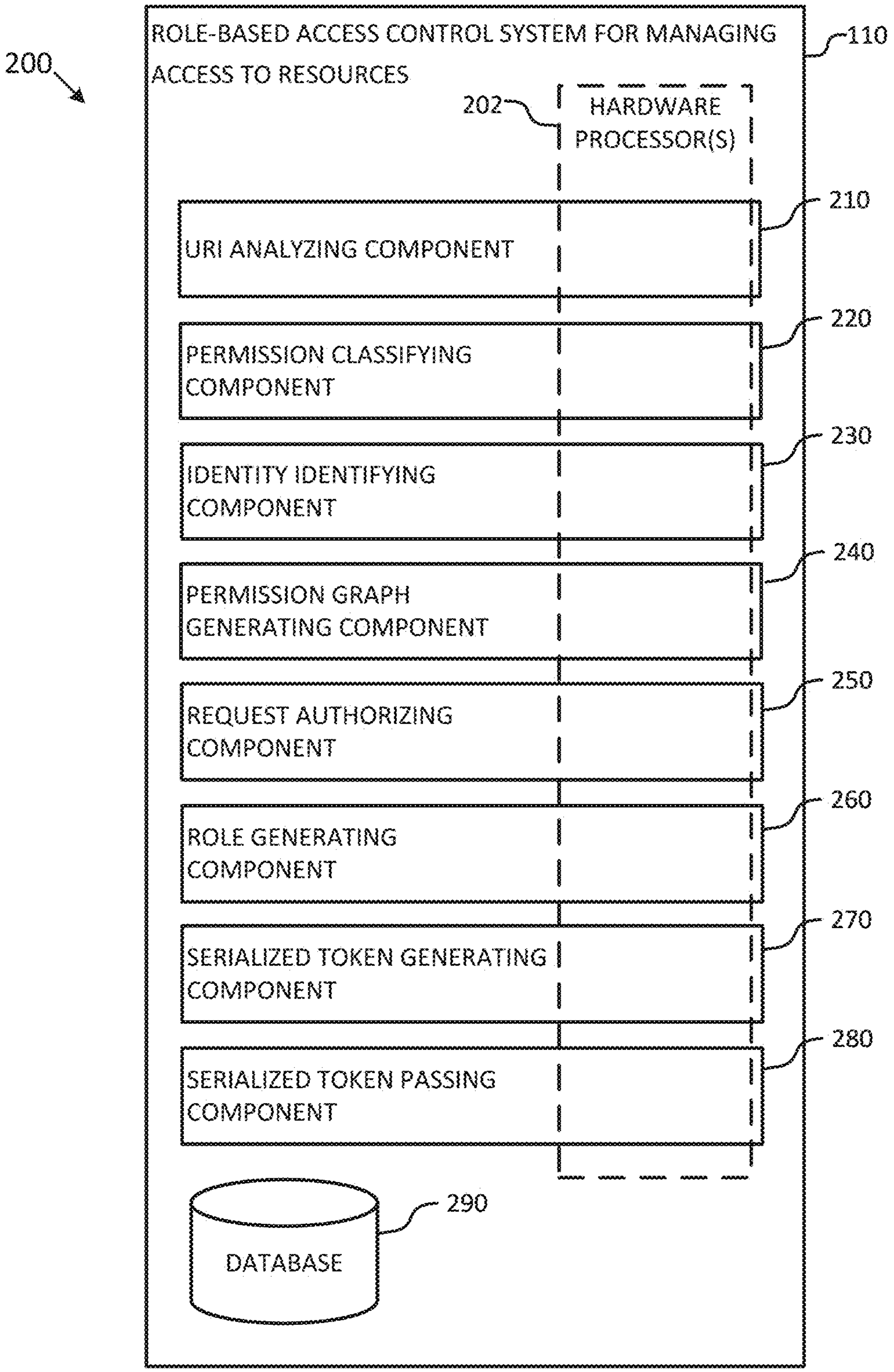
FIG. 2 depicts a block diagram illustrating an example role-based access control system for managing access to resources using serialized tokens, according to various example embodiments.

FIG. 2 depicts a block diagram 200 illustrating an example role-based access control system for managing access to resources using serialized tokens, according to various example embodiments. For some embodiments, the role-based access control system 110 represents an example of the role-based access control system 110 described with respect to FIG. 1. As shown, the role-based access control (RBAC) system 110 comprises a URI analyzing component 210, a permission classifying component 220, an identity identifying component 230, a permission graph generating component 240, a request authorizing component 250, a role generating component 260, a serialized token generating component 270, and a serialized token passing component 280.

The URI analyzing component 210 is configured to receive a request to provide access to one or more resources on the communication platform 106. The request may be an API request that is associated with a URI. The URI analyzing component 210 is configured to analyze the URI to break it down to a format that can be mapped to an existing permission.

In various embodiments, access to one resource may require access to other resources, due to the resource dependencies configured by the communication platform 106. Therefore, URI analyzing component 210 may identify a plurality of permissions in order to provide access to the particular resource identified from the URI. In various embodiments, a plurality of permissions may correspond to one or more services, each of which hosts one or more resources.

The permission classifying component 220 is configured to classify the URI into one or more permissions that allow access to one or more resources on the communication platform 106. In various embodiments, the permission classifying component 220 may construct a tree structure that includes a number of nodes, as illustrated in FIG. 6. The tree structure may also be referred to as a URI classifier. One or more permissions may be identified based on the URI classifier. Each node represents a segment of a URI, such as URI 602, as illustrated in FIG. 6, and is organized based on a URI template. The leaf node 608 represents a classified permission, such as permission 606. Permission 606 is associated with a unique identifier (e.g., SMSid). In various embodiments, multiple permissions may be identified based on the request using the URI classifier, as illustrated in FIG. 6. A URI-classifier may be created or updated each time a change occurs to a URI template mapped to a permission.

The identity identifying component 230 is configured to identify an identity associated with the request. The identity may be associated with one or more granted permissions. An identity, such as a user, may be assigned multiple roles. Each role may be associated with one or more permissions to access one or more resources on the communication platform 106.

Figure 7:
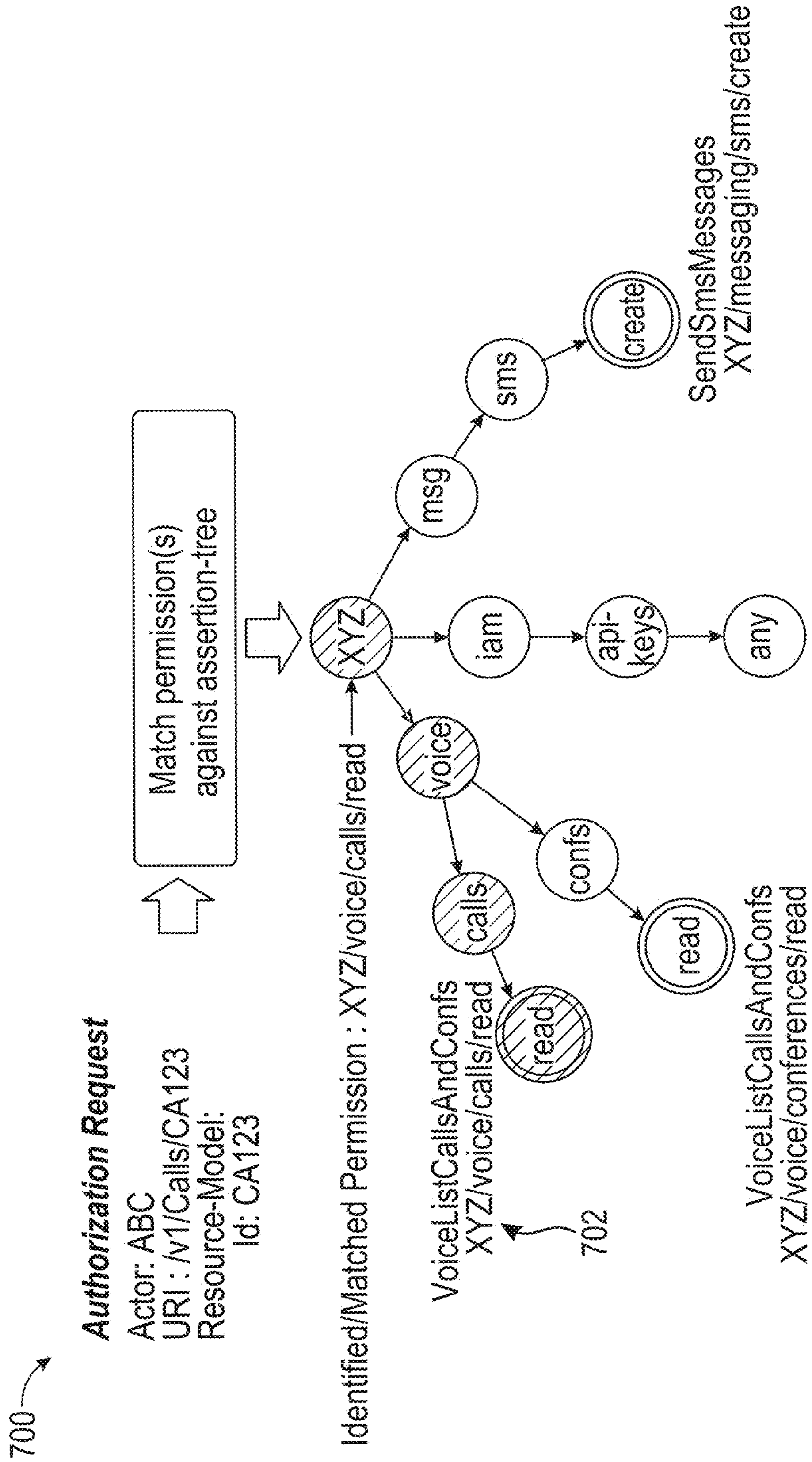
FIG. 7 depicts a block diagram illustrating an example assertion tree, according to various example embodiments.

The permission graph generating component 240 is configured to generate, at runtime, a graph representing the one or more granted permissions associated with the identified identity. The graph, as illustrated in FIG. 7, may also be referred to as an assertion tree. The graph, once generated, may be stored in volatile computer memory (e.g., cache memory) for a limited time period, as an identity is likely to make another request again after a session is initiated. In various embodiments, a session may be initiated once a request is authorized for an identity. The graph may be temporarily stored in cache memory for the duration of the session.

The request authorizing component 250 is configured to authorize the request (e.g., an API request) by traversing the graph (e.g., assertion tree) to determine that the one or more permissions are included in the one or more granted permissions. As illustrated in FIG. 7, permission 702 (i.e., /XYZ/voice/calls/read) is identified from the graph, indicating user (e.g., actor "ABC") has been granted the permission to "read" the resource "calls" for product "voice" that is associated with namespace "XYZ." A namespace may refer to a service provider of the cloud-based communication platform 106.

The role generating component 260 is configured to create roles based on requests from users. A role can be a built-in role that is pre-configured for a particular product or namespace, or a customized role created for an identity that makes a specified request. A customized role may be created for a user to include one or more permissions.

Under the approach described in various embodiments herein, the RBAC system provides functionalities of generating and managing roles (e.g., customized roles) at a granular level that existing solutions cannot provide. A role may be generated to include one or more permissions defined by the text string that includes four parts: namespace, product name, resource name, and the type of action. For example, a customized role may be created to include a single permission that specifies the exact action that can be performed to a specified resource associated with a product and a namespace.

In various embodiments, a user may be a person, a group of people, or an application (e.g., application user). An application may be developed by a third party using a client-side Software Development Kit ("SDK") provided by the communication platform 106.

Figure 8:
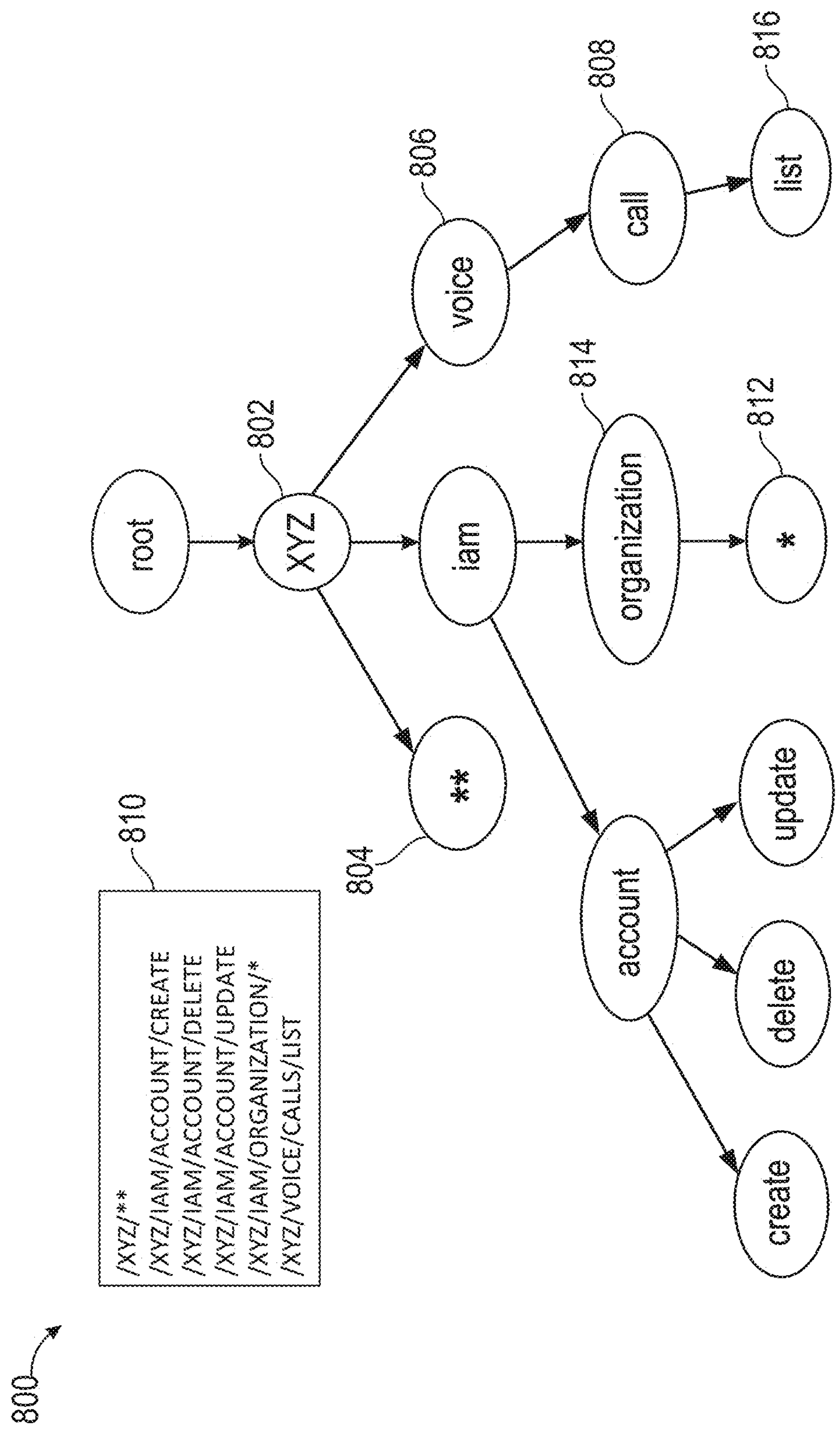
FIG. 8 depicts a block diagram illustrating an example graph representing a serialized token, according to some embodiments.

Upon authorizing the request, the serialized token generating component 270 is configured to generate a graph (e.g., a m-ary tree) as a serialized token that represents the verified permissions (e.g., the plurality of permissions). A m-ary tree is a data structure that includes a collection of nodes. FIG. 8 illustrates an example m-ary tree, which may be converted into a text string "/XYZ **/iam account create/delete/update//organization */// voice calls list." The text string represents the serialized token. Since the serialized token takes up little storage space, it can be packed in a header of an HTTP request to be transmitted to downstream services for processing.

The serialized token passing component 280 is configured to pass the serialized token to downstream services for providing access to the requested resources. In various embodiments, a serialized token is signed using a digital signature algorithm (e.g., Edwards-curve Digital Signature Algorithm) before being sent out by the RBAC system.

Figure 3:
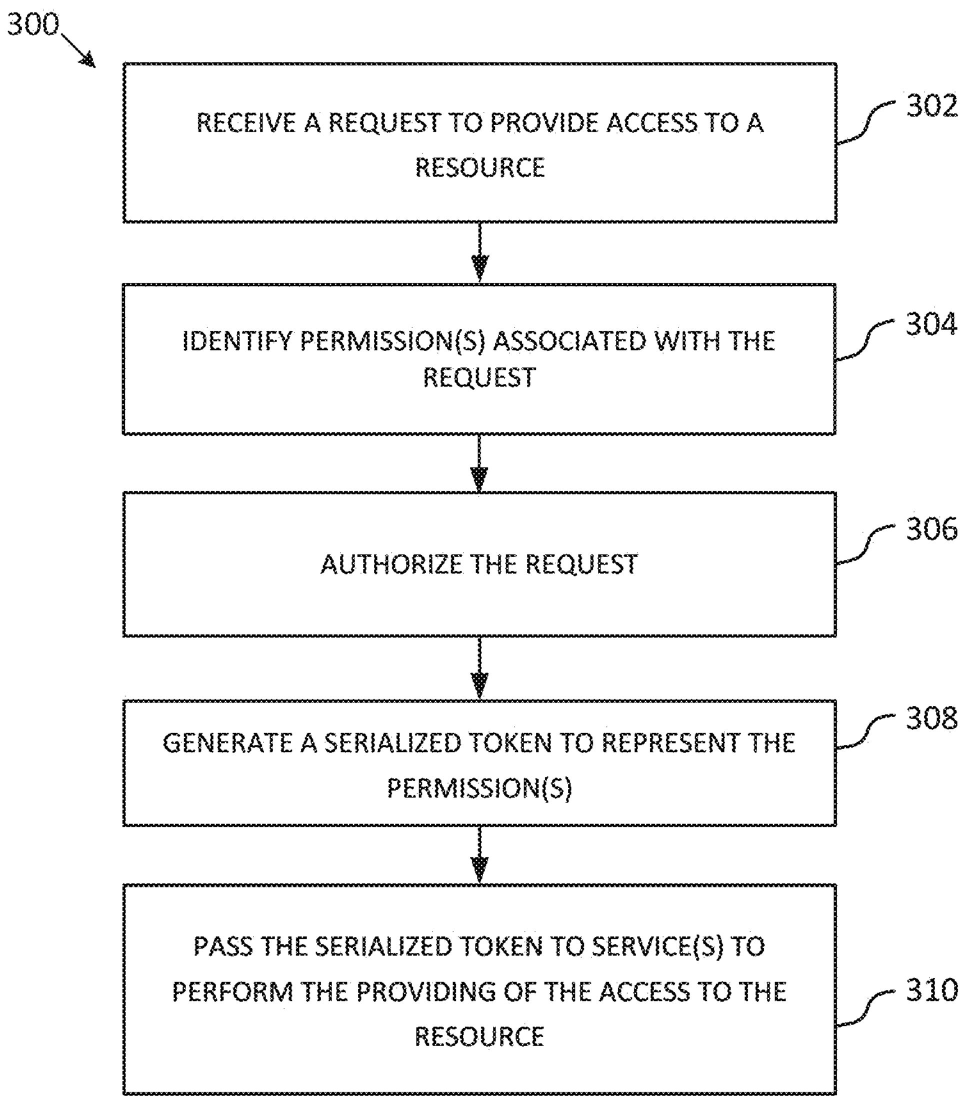
FIG. 3 depicts a flowchart illustrating an example method for managing access to resources using serialized tokens by an example role-based access control system during operation, according to various example embodiments.

FIG. 3 depicts a flowchart illustrating an example method 300 for managing access to resources using serialized tokens by an example role-based access control system 110 during operation, according to various example embodiments. It will be understood that example methods described herein may be performed by a machine in accordance with some embodiments. For example, method 400 can be performed by the RBAC system 110 described with respect to FIG. 1 and FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 300 may be represented by executable instructions that, when executed by a processor of a computing device, cause the computing device to perform method 300. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 302, the processor receives a request to provide access to one or more resources on the communication platform 106. The request may be an API request that is associated with a URI. In example embodiments, the request may be generated (via a call to an API of the RBAC system 110) by one or more downstream systems or services. In example embodiments, the request may be responsive to a detection of an attempt by a user (e.g., via client-side application 114 and/or client device 102) or a request received from the user at the one or more downstream systems or services to access the one or more resources.

At operation 304, the processor identifies a plurality of permissions associated with the request. In some instances, accessing a resource requires permissions to access other resources due to resource dependencies. Therefore, the processor may identify a plurality of permissions based on the one or more permissions identified using the URI classifier, as illustrated in FIG. 6. In example embodiments, the plurality of permissions may be specified by a customer (e.g., via customer computing system 104) through a call of an API of the RBAC system 110.

In various embodiments, the plurality of permissions corresponds to one or more services (e.g., services 118). The resource may be associated with a service (e.g., first service) included in the one or more services. The first service is associated with the one or more permissions identified using the URI classifier.

At operation 306, the processor authorizes the request. The authorization includes determining whether the plurality of permissions is granted for the identity associated with the request. Under the approach described in various embodiments herein, the RBAC system provides functionalities of generating and managing roles (e.g., customized roles) at a granular level that existing solutions cannot provide. A role may be generated to include one or more permissions defined by the text string that includes four parts: namespace, product name, resource name, and the type of action. For example, a role may be created to include a single permission that specifies the exact action that can be performed to a specified resource associated with a product and a namespace.

At operation 308, the processor generates a serialized token to represent the plurality of permissions. Specifically, upon authorizing the request, the processor generates a graph (e.g., a m-ary tree) representing a serialized token that includes the verified plurality of permissions. A m-ary tree is a data structure that includes a collection of nodes. FIG. 8 illustrates an example m-ary tree, which may be converted into a text string "/XYZ **/iam account create/delete/update//organization */// voice calls list." The text string represents the serialized token and consumes very little storage space. Under this approach, the serialized token may be packed in a header of an HTTP request to be transmitted to downstream services for processing.

At operation 310, the processor passes the serialized token to the downstream services (e.g., first service) to perform the providing of access to the resource. In various embodiments, a serialized token is signed using a digital signature algorithm (e.g., Edwards-curve Digital Signature Algorithm) before being sent out by the RBAC system to downstream services (e.g., services 118). In various embodiments, downstream services may include contact center, dialplan, phone number services, and so on. In example embodiments, the representation of the permissions in the specialized data structure (e.g., the m-ary tree) may not only reduces the size of the token in comparison to some alternative representations, but also reduce the amount of time required to process the token by each downstream system; therefore, one or more of memory, bandwidth, or processing power requirements for implementing controlled access to the resources may be reduced through the use of the RBAC system 110.

Though not illustrated, method 300 can include an operation where a graphical user interface for managing access to computing resources can be displayed (or caused to be displayed) by the hardware processor. For instance, the operation can cause a client device (e.g., the client device 102 communicatively coupled to the RBAC system 110) to display the graphical user interface for managing access to computing resources. This operation for displaying the graphical user interface can be separate from operations 302 through 310 or, alternatively, form part of one or more of operations 302 through 310. In example embodiments, the graphical user interface may be caused to be generated and presented (e.g., on client device 102) based on return values received from calls to the API of the RBAC system 110, such as return values indicating one or more actions or whether permissions to access one or more resources are to be authorized.

Figure 4:
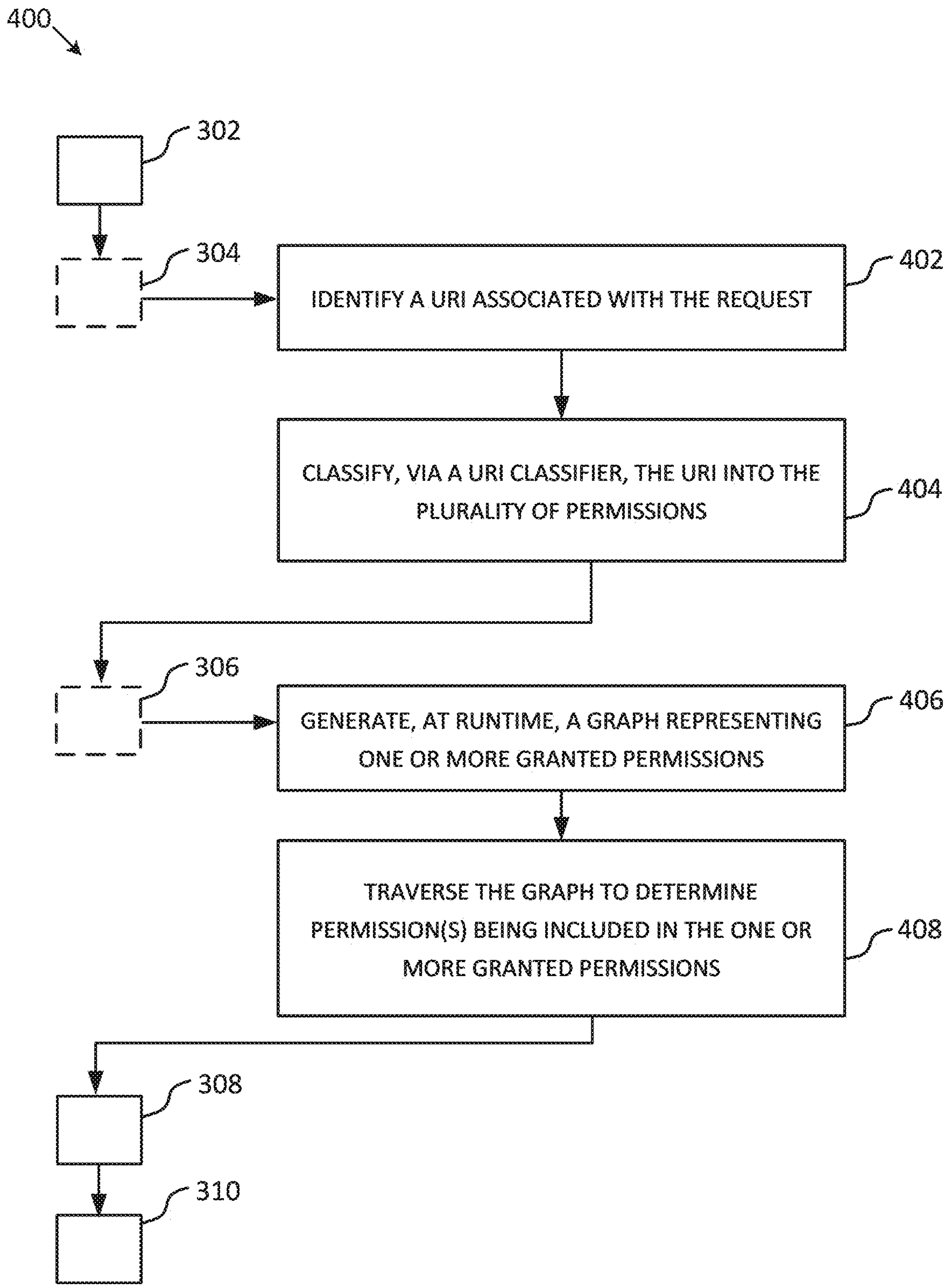
FIG. 4 depicts a flowchart illustrating another example method for managing access to resources using serialized tokens by an example role-based access control system during operation, according to various example embodiments.

FIG. 4 depicts a flowchart illustrating an example method 400 for managing access to resources using serialized tokens by an example role-based access control system 110 during operation, according to various example embodiments. It will be understood that example methods described herein may be performed by a machine in accordance with some embodiments. For example, method 400 can be performed by the RBAC system 110 described with respect to FIG. 1 and FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 400 may be represented by executable instructions that, when executed by a processor of a computing device, cause the computing device to perform method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Method 400 starts with operation 302, as described herein. In various embodiments, operation 304 includes operations 402 and 404. In various embodiments, operation 306 includes operations 406 and 408.

At operation 402, the processor identifies a URI associated with the request.

At operation 404, the processor classifies the URI into one or more permissions to access a resource on the communication platform 106. In various embodiments, the processor may construct a tree structure that includes a number of nodes, as illustrated in FIG. 6. The tree structure may also be referred to as a URI classifier. Each node represents a segment of a URI, such as URI 602, as illustrated in FIG. 6, and is organized based on a URI template. The leaf node 608 represents a classified permission, such as permission 606. Permission 606 is associated with a unique identifier (e.g., SMSid). In various embodiments, a URI classifier may be created or updated every time a change occurs to any URI templates mapped to a permission. In various embodiments, the processor generates the URI classifier based on a URI template and updates the URI classifier at run time based on changes made to the URI template.

At operation 406, the processor generates a graph representing the one or more granted permissions associated with the identified identity at runtime. A graph, as illustrated in FIG. 7, may also be referred to as an assertion tree, representing a number of granted permissions associated with an identity. The assertion tree, once generated, may be stored in volatile computer memory (e.g., cache memory) for a limited time period, as a user is likely to make another request again shortly after making the first one. In various embodiments, a session may be initiated once a request is authorized for a user. The graph may be temporarily stored in cache memory for the duration of the session.

At operation 408, the processor authorizes the request (e.g., an API request) by traversing the graph (e.g., assertion tree as illustrated in FIG. 7) to determine that the permission is included in the one or more granted permissions for the identity associated with the request. In FIG. 7, permission 702 (i.e., /XYZ/voice/calls/read) is identified from the graph, indicating user “ABC” has been granted the permission to “read” the resource “calls” for product “voice,” belonged to namespace “XYZ.” In various embodiments, a valid action to be included in a permission may be “read,” “create,” “update,” “delete,” or “list.” In various embodiments, the processor may identify multiple permissions from the assertion tree based on the permissions identified based on the request.

In various embodiments, the providing of access to the resource includes causing a display of a user interface of a device (e.g., client device 102) associated with the identified identity. The user interface includes an indication of authorization status, indicating whether the request is authorized. For example, the indication of authorization status may be a selectable user interface element (e.g., a window or an icon) notifying the user the request is allowed or denied. In some examples, depending on the type of permission or the gateway (e.g., console interface or API interface) from which a request comes in, the RBAC system may cause the requested resource to be accessible by the requesting user (e.g., displaying the resource in the user interface) or cause the action specified in the permission to be executed automatically (e.g., deleting the resource specified in the request).

In various embodiments, the RBAC system may receive a request to assign a customized role to a user. The customized role may be associated with a list of permissions. The RBAC system may match the list of permission to existing permissions associated with resources on the communication platform 106, and generate the customized role for the user, such as by associating the list of permissions with an identity of the user. Under the approach described in various embodiments herein, the RBAC system 110 provides functionalities of generating and managing customized roles at a granular level that existing solutions cannot provide. A customized role may be generated to include one or more permissions defined by the text string that includes four parts: namespace identifier, product identifier, resource identifier, and action identifier. For example, a customized role may be created to include a single permission that specifies the exact action that can be performed to a specified resource associated with a product and a namespace.

In various embodiments, a communication platform may include a number of products in the namespace (e.g., XYZ). A resource may be a product (e.g., Voice), a feature (e.g., calls or SMS) associated with a product. The RBAC system 110 may reside in the communication platform 106, as illustrated in FIG. 1, or it may be an external system that is communicatively coupled to the communication platform 106.

In various embodiments, a request may be an API request that can be authorized using an API key. An API request occurs when an identity (e.g., a user or an application) adds an endpoint to a URI and makes a call to a server. An API endpoint refers to a touchpoint of an interaction between an API and a system. An API endpoint provides the location where an API accesses a resource.

In various embodiments, a permission is represented by a text string including a namespace identifier, a product identifier (e.g., product name), a resource identifier (e.g., resource name), and an action identifier that indicates the type of action.

In various embodiments, a graph is a tree structure representing the one or more granted permissions. The one or more granted permissions correspond to a role assigned to an identity (e.g., a user, an application, or a credential, such as an API Key).

In various embodiments, the processor receives a request to assign a role (e.g., a customized role) to an identity (e.g., a user, an application, or a credential, such as an API Key). Based on the request, the processor determines that permissions included in the request are valid actions that can be performed on resources in the communication platform 106. Based on the determination, the processor creates a role for the identity to include the permissions.

Though not illustrated, method 400 can include an operation where a graphical user interface for managing access to computing resources can be displayed (or caused to be displayed) by the hardware processor. For instance, the operation can cause a client device (e.g., the client device 102 communicatively coupled to the RBAC system 110) to display the graphical user interface for managing access to computing resources. This operation for displaying the graphical user interface can be separate from operations 402 through 408 or, alternatively, form part of one or more of operations 402 through 408.

Figure 5:
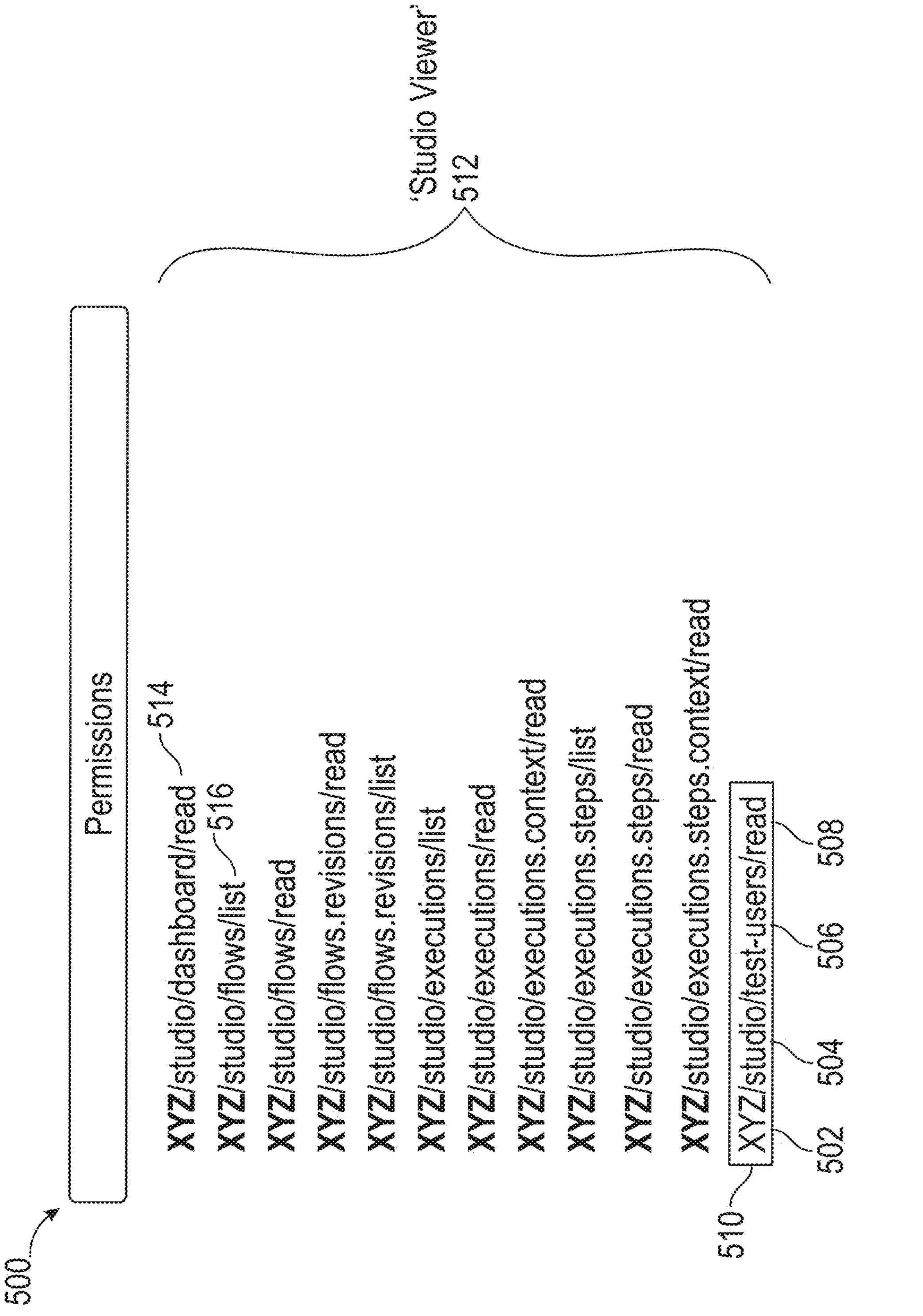
FIG. 5 depicts a block diagram illustrating an example set of permissions included in a customized role, according to various example embodiments.

FIG. 5 depicts a block diagram 500 illustrating an example set of permissions included in a customized role, according to various example embodiments. As shown, role 512, named "Studio Viewer," includes a set of permissions, including permission 510. The permission 510, similar to other permissions as illustrated in FIG. 5, is represented by a text string comprising four parts: "XYZ" as namespace identifier 502, "studio" as product identifier 504, "test-users" as resource identifier 506, and "read" as action identifier 508. A namespace may refer to a service provider of the cloud-based communication platform 106. A role represents a known access pattern for a product and is offered out-of-the-box as part of the communication platform. For example, role 512 "Studio Viewer" is a role that allows a user only to view Studio flows and not be able to edit them. As illustrated in FIG. 5, the actions associated with the list of permissions for "Studio Viewer" are limited to "read 514" and "list 516." A role may be a built-in role or a customized role. A built-in role may not be modifiable by a customer or a user. A customer may create and manage their own customized roles to facilitate the services it provides.

FIG. 6 depicts a block diagram 600 showing an exemplary tree structure illustrating an example URI classifier, according to various example embodiments. As shown, the RBAC system 110 may classify a URI into a permission (e.g., first permission) upon receiving an API receive a request to provide access to certain resources. In various embodiments, the RBAC system 110 may construct a tree structure that includes a number of nodes, as illustrated in FIG. 6. The tree structure may also be referred to as a URI classifier. One or more permissions may be identified based on the URI classifier. Each node represents a segment of the URI 602 and is organized based on a URI template. The leaf node (e.g., leaf node 608) represents a classified permission, such as permission 606. The permission 606 is associated with a unique identifier (e.g., SMSid). In various embodiments, A URI-classifier may be created or updated each time a change occurs to a URI template that is mapped to a permission.

FIG. 7 depicts a block diagram 700 illustrating an example assertion tree, according to various example embodiments. In various embodiments, in order to authorize a request, the RBAC system generates a graph (e.g., the second graph), such as an assertion tree, of all the permission a requested user has been granted and traverses the graph to match the classified permission with a permission included in the graph. If the RBAC system determines there is a match, the request will be granted. Otherwise, the request will be denied. In various embodiments, the graph may be generated at run time and dynamically updated at run time. For example, once a graph is generated at run time, the graph may be stored in volatile computer memory (e.g., cache memory) for a limited time period, as a user is likely to request access to resources again shortly after making the first request. In various embodiments, a session may be initiated once a request is authorized for an identity user. The graph may be temporarily stored in cache memory for the duration of the session.

FIG. 8 depicts a block diagram illustrating an example graph representing a serialized token, according to some embodiments. As shown, item 810 represents the plurality of permissions identified based on the request to provide access to a resource. Upon authorizing the request to determine the identity is granted all permissions listed in item 810, the RBAC system serializes the plurality of permissions by generating the graph, as shown in FIG. 8, representing a serialized token. The graph may be a m-ary tree that includes a number of nodes. The graph is generated based on the text string format that represents a permission. Specifically, a text string that represents a permission includes four parts: namespace, product name, resource name, and the type of action, such as "/namespace/product name/resource name/action." As illustrated in FIG. 8, node 802 represents a namespace "XYZ," node 806 represents a product "voice," node 808 represents a resource "call," and leaf node 816 represents an action "list." Node 812 "*" represents any actions as it belongs to node 814 that represents a resource. Node 804 "" represents any product, resource, and actions, as it is a child node of node 802** that represents the namespace "XYZ."

Figure 9:
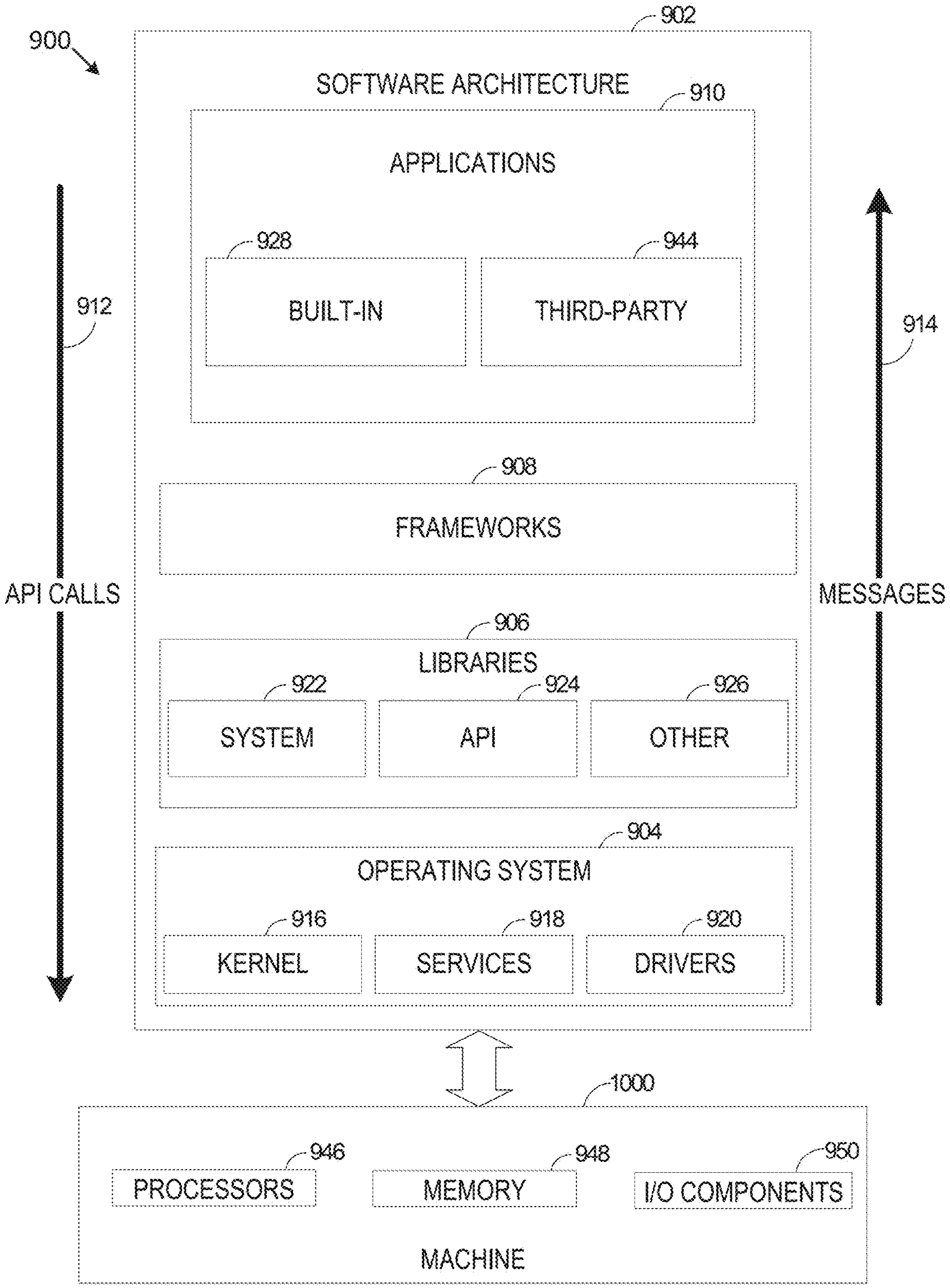
FIG. 9 depicts a block diagram illustrating an architecture of software, according to some embodiments.

FIG. 9 depicts a block diagram 900 illustrating an architecture of software 902, which can be installed on any one or more of the devices described above. FIG. 9 is merely a non-limiting example of a software architecture, and it will be appreciated that many other architectures can be implemented to facilitate the functionality described herein. In various embodiments, the software 902 is implemented by hardware such as a machine 1000 of FIG. 10 that includes processor(s) 946, memory 948, and I/O components 950. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke API calls 912 (application programming interface) through the software stack and receive messages 914 in response to the API calls 912, consistent with some embodiments.

In various implementations, the operating system 904 manages hardware resources and provides common services. The operating system 904 includes, for example, a kernel 916, services 918, and drivers 920. The kernel 916 acts as an abstraction layer between the hardware and the other software layers, consistent with some embodiments. For example, the kernel 916 provides memory management, processor management (e.g., scheduling), component management, networking, and security settings, among other functionalities. The services 918 can provide other common services for the other software layers. The drivers 920 are responsible for controlling or interfacing with the underlying hardware, according to some embodiments. For instance, the drivers 920 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 922 (e.g., C standard library) that can provide functions such as memory allocation functions, string manipulation functions, mathematic functions, and the like. In addition, the libraries

906 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 926 to provide many other APIs to the applications 910.

The frameworks 908 provide a high-level common infrastructure that can be utilized by the applications 910, according to some embodiments. For example, the frameworks 908 provide various graphical user interface (GUI) functions, high-level resource management, high-level location services, and so forth. The frameworks 908 can provide a broad spectrum of other APIs that can be utilized by the applications 910, some of which may be specific to a particular operating system or platform.

In an embodiment, the applications 910 include built-in applications 928 and a broad assortment of other applications, such as a third-party application 944. The built-in applications 928 may include a home application, a contacts application, a browser application, a book reader application, a location application, a media application, a messaging application, a game application. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 944 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 944 can invoke the API calls 912 provided by the operating system 904 to facilitate functionality described herein.

Figure 10:
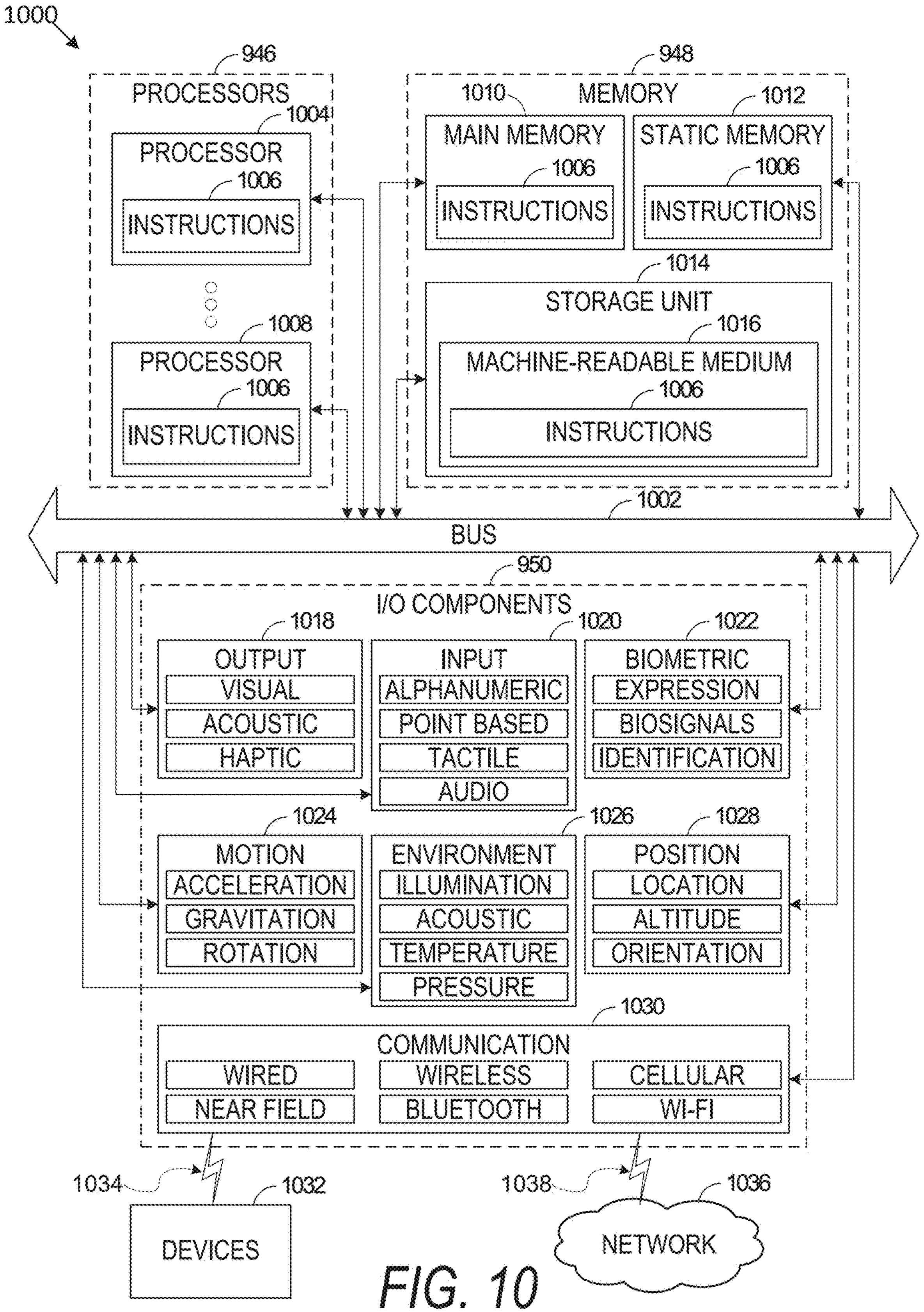
FIG. 10 illustrates a diagrammatic representation of a machine in the form of a computer system within which a set of instructions may be executed for causing a machine to perform any one or more of the methodologies discussed herein, according to some embodiments.

FIG. 10 illustrates a diagrammatic representation of a machine 1000 in the form of a computer system within which a set of instructions may be executed for causing the machine to perform any one or more of the methodologies discussed herein, according to some embodiments. Specifically, FIG. 10 shows a diagrammatic representation of the machine 1000 in the example form of a computer system, within which instructions 1006 (e.g., software, a program, an application, an applet, an app, or other executable code) for causing the machine 1000 to perform any one or more of the methodologies discussed herein may be executed. Additionally, or alternatively, the instructions 1006 may implement the operations of method 300 and method 400 shown in FIG. 3 and FIG. 4, or as elsewhere described herein.

The instructions 1006 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1006, sequentially or otherwise, that specify actions to be taken by the machine 1000. Further, while only a single machine 1000 is illustrated, the term "machine" shall also be taken to include a collection of machines 1000 that individually or jointly execute the instructions 1006 to perform any one or more of the methodologies discussed herein.

The machine 1000 may include processor(s) 946, memory 948, and I/O components 950, which may be configured to communicate with each other such as via a bus 1002. In some embodiments, the processor(s) 946 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1004 and a processor 1008 that may execute the instructions 1006. The term "processor" is intended to include multi-core processors that may comprise two or more independent processors (sometimes referred to as "cores") that may execute instructions contemporaneously. Although FIG. 10 shows multiple processor(s) 946, the machine 1000 may include a single processor with a single core, a single processor with multiple cores (e.g., a multi-core processor), multiple processors with a single core, multiple processors with multiples cores, or any combination thereof.

The memory 948 may include a main memory 1010, a static memory 1012, and a storage unit 1014, each accessible to the processor(s) 946 such as via the bus 1002. The main memory 1010, the static memory 1012, and storage unit 1014 store the instructions 1006 embodying any one or more of the methodologies or functions described herein. The instructions 1006 may also reside, completely or partially, within the main memory 1010, within the static memory 1012, within the storage unit 1014, within at least one of the processor(s) 946 (e.g., within the processor's cache memory), or any suitable combination thereof, during execution thereof by the machine 1000.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 10. The I/O components 950 are grouped according to functionality merely for simplifying the following discussion and the grouping is in no way limiting. In some embodiments, the I/O components 950 may include output components 1018 and input components 1020. The output components 1018 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1020 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some embodiments, the I/O components 950 may include biometric components 1022, motion components 1024, environmental components 1026, or position components 1028, among a wide array of other components. For example, the biometric components 1022 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1024 may include acceleration sensor components (e.g., accelerometer), gravitation sensor components, rotation sensor components (e.g., gyroscope), and so forth. The environmental components 1026 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1028 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 1030 operable to couple the machine 1000 to a network 1036 or devices 1032 via a coupling 1038 and a coupling 1034, respectively. For example, the communication components 1030 may include a network interface component or another suitable device to interface with the network 1036. In further examples, the communication components 1030 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1032 may be another machine or any of a wide variety of peripheral devices (e.g., a peripheral device coupled via a USB).

Moreover, the communication components 1030 may detect identifiers or include components operable to detect identifiers. For example, the communication components 1030 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1030, such as location via Internet Protocol (IP) geolocation, location via Wi-Fi® signal triangulation, location via detecting an NFC beacon signal that may indicate a particular location, and so forth.

The various memories (i.e., memory 948, main memory 1010, and/or static memory 1012) and/or storage unit 1014 may store one or more sets of instructions and data structures (e.g., software) embodying or utilized by any one or more of the methodologies or functions described herein. These instructions (e.g., the instructions 1006), when executed by processor(s) 946, cause various operations to implement the disclosed embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In various embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can at a later time access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers, with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In some embodiments, one or more portions of the network 1036 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1036 or a portion of the network 1036 may include a wireless or cellular network, and the coupling 1038 may be a Code Division Multiple Access (CDMA) connection, a Global System for Mobile communications (GSM) connection, or another type of cellular or wireless coupling. In this example, the coupling 1038 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1006 may be transmitted or received over the network 1036 using a transmission medium via a network interface device (e.g., a network interface component included in the communication components 1030) and utilizing any one of a number of well-known transfer protocols (e.g., hypertext transfer protocol (HTTP)). Similarly, the instructions 1006 may be transmitted or received using a transmission medium via the coupling 1034 (e.g., a peer-to-peer coupling) to the devices 1032. The terms "non-transitory computer-readable storage medium," "transmission medium" and "signal medium" mean the same thing and may be used interchangeably in this disclosure. The terms "transmission medium" and "signal medium" shall be taken to include any intangible medium that is capable of storing, encoding, or carrying the instructions 1006 for execution by the machine 1000, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "non-transitory computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Although examples have been described with reference to some embodiments or methods, it will be evident that various modifications and changes may be made to these embodiments without departing from the broader scope of the embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Glossary

"CARRIER SIGNAL" in this context refers to any intangible medium that is capable of storing, encoding, or carrying instructions for execution by the machine 1000, and includes digital or analog communications signals or other intangible medium to facilitate communication of such instructions 1006. Instructions 1006 may be transmitted or received over the network 1036 using a transmission medium via a network interface device and using any one of a number of well-known transfer protocols.

"CLIENT DEVICE" in this context refers to any machine 1000 that interfaces to a communications network 1036 to obtain resources from one or more server systems or other client devices 102. A client device 102 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 932.

"COMMUNICATIONS NETWORK" in this context refers to one or more portions of a network 1036 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1036 or a portion of a network 1036 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device, or other tangible media able to store instructions 1006 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1006. The term "machine-readable medium" shall also be taken to include any medium, or combination of multiple media, that is capable of storing instructions 1006 (e.g., code) for execution by a machine 1000, such that the instructions 1006, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 946) may be configured by software (e.g., an application 910 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor 1004 or other programmable processors. Once configured by such software, hardware components become specific machines 1000 (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor or processors 946, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1002) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 946 that are temporarily configured (e.g., by software) or permanently configured to perform the relevant operations. Whether temporarily or permanently configured, such processors 946 may constitute processor-implemented components that operate to perform one or more operations or functions described herein. As used herein, "processor-implemented component" refers to a hardware component implemented using one or more processors 946. Similarly, the methods described herein may be at least partially processor-implemented, with a particular processor or processors 946 being an example of hardware. For example, at least some of the operations of a method may be performed by one or more processors 946 or processor-implemented components. Moreover, the one or more processors 946 may also operate to support performance of the relevant operations in a "cloud computing" environment or as a "software as a service" (SaaS). For example, at least some of the operations may be performed by a group of computers (as examples of machines 1000 including processors 946), with these operations being accessible via a network 1036 (e.g., the Internet) and via one or more appropriate interfaces (e.g., an API). The performance of certain of the operations may be distributed among the processors 946, not only residing within a single machine 1000, but deployed across a number of machines 1000. In some example embodiments, the processors 946 or processor-implemented components may be located in a single geographic location (e.g., within a home environment, an office environment, or a server farm). In other example embodiments, the processors 946 or processor-implemented components may be distributed across a number of geographic locations.

"PROCESSOR" in this context refers to any circuit or virtual circuit (a physical circuit emulated by logic executing on an actual processor 1004) that manipulates data values according to control signals (e.g., "commands," "op codes," "machine code," etc.) and which produces corresponding output signals that are applied to operate a machine 1000. A processor 1004 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1004 may further be a multi-core processor having two or more independent processors 946 (sometimes referred to as "cores") that may execute instructions 1006 contemporaneously.

What is claimed is:

1. A method comprising:

receiving a request to provide an access to a resource, the request being associated with a plurality of permissions;

generating a tree structure that represents the plurality of permissions;

generating a serialized token by converting the tree structure into one or more text strings; and passing the serialized token to one or more services for providing the access to the resource.

2. The method of claim 1, comprising:

identifying the plurality of permissions associated with the request;

authorizing the request based on the plurality of permissions; and in response to authorizing the request, generating the tree structure that represents the plurality of permissions.

3. The method of claim 2, wherein the tree structure comprises a m-ary tree structure.

4. The method of claim 1, comprising:

identifying an identity based on the request, the identity being associated with a set of granted permissions;

generating, at runtime, a graph representing the set of granted permissions; and traversing the graph to determine that the plurality of permissions is included in the set of granted permissions.

5. The method of claim 4, comprising:

initiating a session upon authorizing the request;

storing the graph in a cache during the session;

detecting a change to the set of granted permissions associated with the identity; and dynamically updating the graph to incorporate the change into the graph.

6. The method of claim 1, comprising:

signing the serialized token before passing the serialized token to the one or more services for providing the access to the resource.

7. The method of claim 1, wherein each of the plurality of permissions is represented by a text string.

8. The method of claim 1, wherein each of the one or more text strings comprises one or more of a namespace identifier, a product identifier, a resource identifier, and an action identifier.

9. The method of claim 8, wherein the action identifier is associated with an action that includes any one of a read action, a create action, an update action, a delete action, or a list action.

10. The method of claim 1, wherein the request is received via an Application Programming Interface (API) call.

11. A system comprising:

a memory storing instructions; and one or more hardware processors communicatively coupled to the memory and configured by the instructions to perform operations comprising:

receiving a request to provide an access to a resource, the request being associated with a plurality of permissions;

generating a tree structure that represents the plurality of permissions;

generating a serialized token by converting the tree structure into one or more text strings; and passing the serialized token to one or more services for providing the access to the resource.

12. The system of claim 11, wherein the operations comprise:

identifying the plurality of permissions associated with the request;

authorizing the request based on the plurality of permissions; and in response to authorizing the request, generating the tree structure that represents the plurality of permissions.

13. The system of claim 12, wherein the tree structure comprises a m-ary tree structure.

14. The system of claim 11, wherein the operations comprise:

identifying an identity based on the request, the identity being associated with a set of granted permissions;

generating, at runtime, a graph representing the set of granted permissions; and traversing the graph to determine that the plurality of permissions is included in the set of granted permissions.

15. The system of claim 14, wherein the operations comprise:

initiating a session upon authorizing the request;

storing the graph in a cache during the session;

detecting a change to the set of granted permissions associated with the identity; and dynamically updating the graph to incorporate the change into the graph.

16. The system of claim 11, wherein the operations comprise:

signing the serialized token before passing the serialized token to the one or more services for providing the access to the resource.

17. The system of claim 11, wherein the request is received via an Application Programming Interface (API) call.

18. The system of claim 11, wherein each of the plurality of permissions is represented by a text string, and wherein each of the one or more text strings comprises one or more of a namespace identifier, a product identifier, a resource identifier, and an action identifier.

19. The system of claim 18, wherein the action identifier is associated with an action that includes any one of a read action, a create action, an update action, a delete action, or a list action.

20. A non-transitory computer-readable storage medium comprising instructions that, when executed by a processing device, cause the processing device to perform operations comprising:

receiving a request to provide an access to a resource, the request being associated with a plurality of permissions;

generating a tree structure that represents the plurality of permissions;

generating a serialized token by converting the tree structure into one or more text strings; and passing the serialized token to one or more services for providing the access to the resource.

* * * * *